United States Patent
Felsl et al.

(10) Patent No.: US 8,973,694 B2
(45) Date of Patent: Mar. 10, 2015

(54) DRIVE UNIT

(75) Inventors: Andreas Felsl, Biel (CH); Florian Loeffl, Tanrkirchen (DE)

(73) Assignee: Joy Industrial Co., Ltd., Taichung Hsien (TW)

( * ) Notice: Subject to any disclaimer, the term of this patent is extended or adjusted under 35 U.S.C. 154(b) by 350 days.

(21) Appl. No.: 13/392,756

(22) PCT Filed: Aug. 24, 2010

(86) PCT No.: PCT/EP2010/005180
§ 371 (c)(1),
(2), (4) Date: Apr. 11, 2012

(87) PCT Pub. No.: WO2011/023366
PCT Pub. Date: Mar. 3, 2011

(65) Prior Publication Data
US 2012/0186892 A1    Jul. 26, 2012

(30) Foreign Application Priority Data

Aug. 28, 2009  (DE) .......................... 10 2009 039 635
Aug. 31, 2009  (DE) .......................... 10 2009 039 333
Mar. 15, 2010  (DE) .......................... 10 2010 011 523

(51) Int. Cl.
| | | |
|---|---|---|
| B62M 1/36 | (2013.01) | |
| B62M 6/50 | (2010.01) | |
| B62M 11/14 | (2006.01) | |
| B62M 1/14 | (2006.01) | |
| B62M 6/55 | (2010.01) | |

(52) U.S. Cl.
CPC . B62M 1/36 (2013.01); B62M 1/14 (2013.01); B62M 6/50 (2013.01); B62M 6/55 (2013.01); B62M 11/145 (2013.01)

USPC .................................. 180/206.3; 180/206.4

(58) Field of Classification Search
CPC ............ B62M 1/36; B62M 6/50; B62M 6/55; B62M 11/14; B62M 11/145
USPC ......... 180/206.2, 206.3, 206.4, 220; 280/259, 280/260, 261
See application file for complete search history.

(56) References Cited

U.S. PATENT DOCUMENTS

| | | | |
|---|---|---|---|
| 5,915,493 A | 6/1999 | Nakayama | |
| 6,196,347 B1 | 3/2001 | Chao et al. | |
| 6,672,418 B1 * | 1/2004 | Makino ...................... 180/206.3 |
| 8,342,553 B2 * | 1/2013 | Patterson ...................... 280/260 |
| 8,491,429 B2 * | 7/2013 | Cranston et al. .............. 474/144 |
| 8,534,161 B2 * | 9/2013 | Schlumpf ........................ 74/650 |
| 2012/0247853 A1 * | 10/2012 | Hashimoto et al. ........ 180/206.3 |

FOREIGN PATENT DOCUMENTS

| | | |
|---|---|---|
| CN | 1184052 | 6/1998 |
| CN | 101423102 | 5/2009 |
| WO | 2010022578 | 3/2010 |

* cited by examiner

*Primary Examiner* — Anne Marie Boehler
(74) *Attorney, Agent, or Firm* — Rosenberg, Klein & Lee

(57) ABSTRACT

The invention relates to a drive unit for a muscle-powered vehicle having a crankshaft mounted in a crankcase or in a frame. At least one crank for transferring the muscle power of a driver to a drive wheel of the vehicle is fastened to the crankshaft. A gear unit is provided, which is arranged in the power train from the crankshaft to a driven gear of the gear unit coupled to the drive wheel of the vehicle. According to the invention, a substantially stationary part of the gear unit for determining a total torque of the crankshaft is supported on the crankcase or on the frame.

12 Claims, 2 Drawing Sheets

DRIVE UNIT

CROSS-REFERENCE TO RELATED APPLICATION

This application claims priority to German Patent Application No. DE 10 2010 011 523.1 filed on Mar. 15, 2010, which claims priority to German Patent Application No. DE 10 2009 039 333.1 filed on Aug. 31, 2009, which claims priority to German Patent Application No. DE 10 2009 039 635.7 filed on Aug. 28, 2009, the disclosure each of which is expressly incorporated herein.

BACKGROUND OF THE INVENTION

Field of the Invention

The invention relates to a drive unit for muscle-powered vehicles with torque measurement.

In the case of drive units for muscle-powered vehicles—in particular for bicycles—there are various approaches for measuring the torque at a muscle-powered crankshaft. This torque measurement may, for instance, serve to measure the performance of a driver or to control an auxiliary motor of the vehicle.

In prior art, drive units with torque measurement at rotating and/or moved parts are known. Thus, a rotating torque-impacted sleeve may be equipped with a magnet, and its deformation is measured inductively on the basis of the torque transmitted by it. Or else, the torque measurement is performed by the measurement of a tension of a circulating chain that serves to couple a crankshaft and a drive wheel of the vehicle.

The effort involved with the technology of the device is a disadvantage of such torque measurement at rotating and/or moved parts.

Accordingly, it is also known to measure a bending of a stationary axle of the drive wheel.

The disadvantage of such drive units with torque measurement is the influence of disturbances caused by further, in particular changing, strains of the axle. Such changing strains may, for instance, occur if a cyclist sitting on the saddle rises from the saddle and continues cycling in an upright position.

Compared to this, it is an object of the invention to provided a drive unit with torque measurement which is simple with respect to device technology and also largely free of external effects that distort the measurement result.

This object is solved by a drive unit with the features of claim 1.

The drive unit for a muscle-operated vehicle in accordance with the invention has a crankshaft mounted in a crankcase or in a frame. At least one crank for transferring the muscle power of a driver to a drive wheel of the vehicle is fastened to the crankshaft. Furthermore, a gear unit or a gear mechanism, respectively, is provided which is arranged in the power train from the crankshaft to a driven gear of the gear unit or the gear mechanism, respectively, coupled to the drive wheel of the vehicle. According to the invention, a substantially stationary part or a part fixedly mounted on the frame, respectively, of the gear unit or gear mechanism, respectively, for determining a total torque of the crankshaft is supported on the crankcase or on the frame. The drive unit according to the invention is simple with respect to device technology and also largely free of external effects that distort the measurement result.

Further advantageous designs of the invention are described in the dependent claims.

In a preferred further development the vehicle is a bicycle, wherein the crankcase is a bottom bracket shell, and wherein two cranks are fastened to the crankshaft. The muscle power is produced by the legs of the cyclist. In such vehicles the torque is, for instance, of interest for measuring the performance of the cyclist or for controlling an auxiliary motor of the vehicle.

Preferably, the driven gear is a toothed wheel or a chain wheel that is coupled to the drive wheel of the vehicle via a chain.

In order to minimize the manufacturing and assembling effort for the drive unit according to the invention it is preferred if the substantially stationary part is supported on a standard bottom bracket shell via a torque sensor. Thus, the drive unit according to the invention including the torque sensor may also be mounted subsequently to a finished bicycle with an appropriate standard bottom bracket shell.

In this respect, it is preferred if the torque sensor is fastened to the standard bottom bracket shell by means of the International Standard Chain Guide Mount (ISCG).

An International Standard for Bottom Bracket Shells (BB30) or BSA bearing may be considered to be a standard bottom bracket shell.

If a longitudinal axis of the crankshaft coincides with a central axis of the drive mechanism or with a longitudinal axis of a driven gear of the drive mechanism which is connected with the drive wheel, there results a largely rotationally symmetric arrangement with a corresponding esthetic impression.

In a preferred further development, the torque sensor comprises a sleeve arranged approximately concentrically to the crankshaft and having a strain gauge or a piezo element fastened thereto. The sleeve is fastened to the standard bottom bracket shell by the International Standard Chain Guide Mount (ISCG).

If the gear mechanism is a planetary gear with an annulus gear, a sun gear, a planet carrier and planets mounted thereon, and if the driven gear is fastened to the annulus gear, a driven gear that is smaller than those of prior art is possible.

In accordance with a first variant, the substantially stationary part or the part fixedly mounted on the frame, respectively, is the sun gear, while the planet carrier is directly or indirectly fastened to the crankshaft.

In accordance with a second variant, the substantially stationary part or the part fixedly mounted on the frame, respectively, is the planet carrier, while the sun gear is directly or indirectly fastened to the crankshaft.

A preferred further development of the drive unit for a vehicle comprises a crankshaft mounted in a crankcase or in a frame and having two cranks fastened thereto, wherein a toothed wheel is arranged between the two cranks, through which the muscle power of a cyclist may be transferred to a drive wheel of the vehicle. A motor is provided from which, as a function of a total torque of the crankshaft, a torque is transferred to the crankshaft. Furthermore, a planetary gear with an annulus gear, a sun gear, a planet carrier, and planets mounted thereon is provided, wherein the toothed wheel is fastened to the outer circumference of the annulus gear. Either the planet carrier or the sun gear is fastened to the crankshaft. Correspondingly, the sun gear or the planet carrier is fastened to the crankcase or to the frame, respectively. Thus, the torque of the crankshaft may be measured by the relative position of a stationary part (sun gear or planet carrier).

It is particularly preferred if at least one torque sensor is provided which is in operative connection with the crankcase or with the frame, respectively, on the one hand, and with the sun gear or with the planet carrier, on the other hand. The total torque of the crankshaft may be measured by this torque sensor.

Depending on the embodiment, the sun gear or the planet carrier may be mounted on the crankshaft.

In a preferred further development, the toothed wheel and the planetary gear are positioned between the crankcase and the first crank, while the motor is positioned between the second crank and the crankcase.

Preferably, a housing of the motor—e.g. of an electric motor—is fastened to the crankcase or to the frame of the vehicle, respectively.

A gear mechanism may be provided in the torque train between the motor and the crankshaft and be accommodated in the housing of the motor. Hence, motors with nominal speeds deviating from the speed range of the crankshaft may also be used.

In a particularly preferred embodiment, the vehicle is a bicycle, wherein the muscle power is produced by the legs of the cyclist, and wherein each crank has a pedal, and wherein the crankcase is a bottom bracket shell.

Or else, the vehicle is a hand bike, wherein the muscle power is produced by the arms of the cyclist, and wherein each crank has a hand grip.

BRIEF DESCRIPTION OF THE DRAWINGS

In the following, different embodiments of the invention will be described in detail by means of the figures. There show:

FIG. 1 shows a first embodiment of a drive unit in accordance with the invention.

Figure 1:
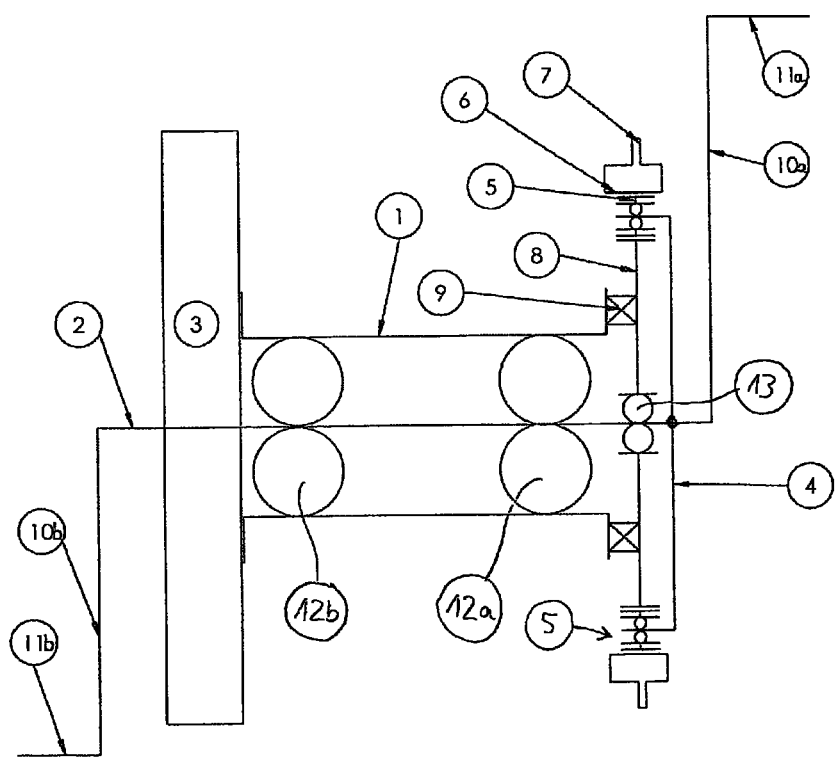
FIG. 1 a first embodiment of a drive unit in accordance with the invention in a schematic illustration.

In a bottom bracket shell 1 that is fixedly connected with the frame of a bicycle (not illustrated in detail), a crankshaft 2 is mounted via two bearings 12a, 12b, wherein one crank 10a, 10b each is fastened to the ends thereof. At each crank 10a, 10b, a pedal 11a, 11b is arranged to rotate, through which the cranks 10a, 10b and hence the crankshaft 2 are driven by a cyclist of the bicycle. This drive is, in accordance with prior art, effected via a chain wheel or toothed wheel 7, respectively, driving a rear wheel of the bicycle via a chain.

In accordance with the invention, the chain wheel or toothed wheel 7, respectively, is not fixedly connected with the crankshaft 2, but is driven via a planetary gear. The crankshaft 2 drives a planet carrier 4 that is fixedly connected therewith and that has a plurality of planet wheels arranged at the circumference thereof, with two planet wheels 5 thereof being illustrated in the figure.

The planet wheels 5 circulate around a stationary sun gear 8 that is mounted via at least one bearing 13 opposite to the rotating crankshaft 2. The sun gear 8 is fixed to the bottom bracket shell 1 or to the frame of the bicycle, respectively, through torque sensors 9, wherein a torque of the sun gear 8 may be measured by the torque sensors 9 by the torsion thereof relative to the bottom bracket shell 1. Hence, the torque of the crankshaft 2 may, in accordance with the invention, be measured via stationary parts (sun gear 8 and bottom bracket shell 1).

An annulus gear 6 of the planetary gear is arranged in the interior of the chain wheel or toothed wheel 7, respectively. Hence, in the case of a pedaling or cranking motion of the cyclist, the planetary gear 4 and the planet wheels 5 circulate along with the crankshaft 2 and drive the chain wheel or toothed wheel 7, respectively, via the annulus gear 6.

With the load or the torque, respectively, increasing, an electric motor 3 is switched on, wherein this electric motor 3 is of comparatively flat construction and is arranged at the side of the bottom bracket shell 1 facing away from the planetary gear between the bottom bracket shell and the second crank 10b. Different characteristic curves of the electric motor 3 are possible, e.g. the switching-on may be performed continuously proportionally or else by different characteristic curves.

A gear mechanism (not illustrated) may be integrated in the housing of the electric motor 3, in particular so as to compensate for basic speed differences between the electric motor 3 and the crankshaft 2. Thus, the electric motor 3 drives the crankshaft 2 either directly or indirectly via the gear mechanism.

Deviating from the first embodiment, the planet carrier 4 instead of the sun gear 8 may be fastened to the crankcase 1 or to the frame. Accordingly, the torque sensor 9 that is, on the one hand, connected with the crankcase 1 or with the frame, respectively, is connected with the planet carrier 4, on the other hand. This also enables the torque of the crankshaft 2 to be measured via stationary parts and the electric motor 3 to be controlled accordingly.

Thus, the following structure may be provided in correspondence with the present invention:

On the crankshaft 2 that is mounted in the bottom bracket shell 1, a motor or motor gear unit 3 is mounted on the one side of the bottom bracket shell 1 and a planetary gear on the other side. Cranks 10 and pedals 11 are arranged at both sides. The planet carrier 4 is fixedly connected with the crankshaft 2. The sun gear 8 that may be mounted on the crankshaft 2 is fixedly connected with the bottom bracket shell 1 via a torque support 9. Sensors for measuring the torque at the sun gear 8 are arranged at the torque support 9. Via the annulus gear 6, the entire driving power is delivered from the motor and from the cyclist to the chain wheel or toothed wheel 7, respectively.

Figure 2:
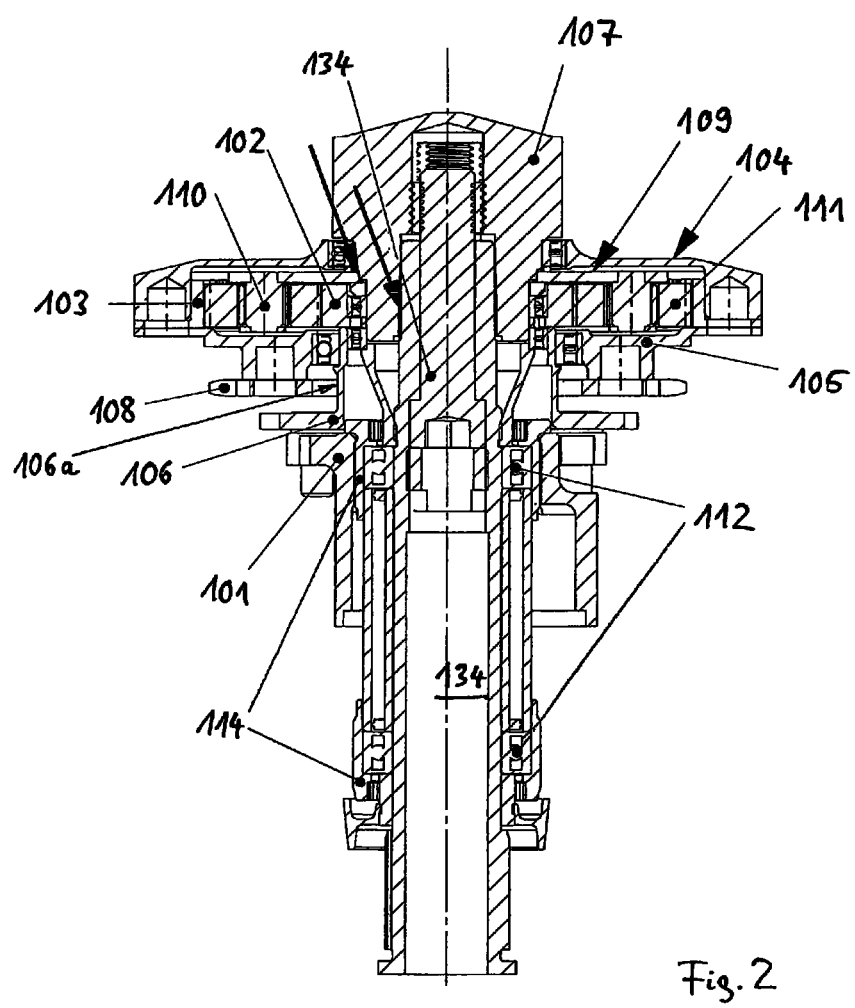
FIG. 2 a second embodiment of a drive unit in accordance with the invention in a sectional illustration.

FIG. 2 shows a second embodiment of a drive unit in accordance with the invention in a sectional view.

A bottom bracket shell 101 with ISCG accommodation is fastened to a frame (not illustrated in detail) of a bicycle. A bottom bracket assembly with two bearings 112 is provided therein, which are each accommodated in the bottom bracket shell 101 via a bearing cup 114. A crankshaft 134 comprising a continuous hollow shaft and a solid shaft is mounted to be rotated in the bottom bracket shell 101 via the bottom bracket assembly 112, 114. The solid shaft is accommodated in a top portion (in FIG. 2) of the hollow shaft and is fastened there. At the two end portions of the crankshaft 134, one crank each is fastened, with only a central portion of one crank 107 being illustrated in FIG. 2.

At the outer circumference of the central portion of the crank 107, a planetary gear is arranged. It comprises a housing consisting of a (in FIG. 2) top housing portion 104 and a bottom housing portion 105. Integrally with the housing 104, 105 there is formed an annulus gear 103 having four planets or planet wheels distributed along the inner circumference thereof, with only two planet wheels 111 being illustrated in FIG. 2. Via appropriate planetary axles 110 they are accommodated and mounted to be rotated at a planet carrier 109, wherein the planet carrier 109 is connected in a rotation-resistant manner with the crankshaft 134 via the crank 107.

A sun gear 102 that abuts at the respective inner sides of the planet wheels 111 and along which the planet wheels 111 cog, is, via a sleeve 106a of a torque sensor 106, connected in a largely rotation-resistant manner with the bottom bracket shell 101. A rotation-resistant connection of the torque sensor 106 with the bottom bracket shell 101 pursuant to the "International Standard Chain Guide Mount" (ISCG) is provided.

The housing portion 104 of the planetary gear is mounted to be rotated at the crank 107 via a bearing, while the housing portion 105 is mounted to be rotated at a connection portion provided between the sun 102 and the sleeve 106a via a bearing.

At the contact area—marked by an arrow—between the hollow shaft of the crankshaft 134 and the crank 107, a shaft hub joint is provided. Likewise, a shaft hub joint marked by an arrow is provided between the crank 107 and the planet carrier 109.

At the (in FIG. 2) lower housing portion 105 of the planetary gear, a chain ring or chain wheel 108, respectively, is fastened, which is, via a chain (not illustrated) coupled to a drive wheel or rear wheel (not illustrated, either) of the bicycle.

In the following, the function of the second embodiment of the invention will be explained in accordance with FIG. 2. In the power train from the crank 107 to the chain wheel 108 the planetary gear is arranged which converts a torque and a speed of the crankshaft 134 to a torque and a speed of the chain wheel 108. The planet carrier 109 and the planetary axles 110 rotate along with the crankshaft 134. Since the sun gear 102 is, via the torque sensor 106, substantially held in a manner fixedly mounted on the frame at the bottom bracket shell 101, the planet wheels 111 take along the housing 104, 105 and hence the chain wheel 108 via the annulus gear 101.

As a function of the torque introduced at the crankshaft 134, a torque is produced at the sun gear 102 which results in a torsion of the sleeve 106a that is fastened to the bottom bracket shell 101. This fastening corresponds to the "International Standard Chain Guide Mount" (ISCG). The torsion of the stationary sleeve 106a is, in a simple manner with respect to device technology, measured in a stationary part of the gear mechanism and free of disturbances by means of strain gauges or piezo elements.

The planetary gear with the chain wheel 108 fastened thereto and the torque sensor 106 may be screwed as a module to an existing bottom bracket shell 101 with ISCG accommodation with a relatively low assembly effort.

Deviating from the embodiments illustrated, the torque measurement at a largely stationary gear member in accordance with the invention may also be performed at a simple spur gear unit at a mounting of a spur gear or its shaft, respectively.

The invention relates to a drive unit for a muscle-powered vehicle having a crankshaft mounted in a crankcase or in a frame. At least one crank for transferring the muscle power of a driver to a drive wheel of the vehicle is fastened to the crankshaft. A gear unit is provided, which is arranged in the power train from the crankshaft to a driven gear of the gear unit coupled to the drive wheel of the vehicle. According to the invention, a substantially stationary part of the gear unit for determining a total torque of the crankshaft is supported on the crankcase or on the frame.

The invention claimed is:

1. A drive unit for a muscle-powered bicycle comprising:
   a crankshaft mounted for rotation within a bottom bracket shell affixed to a frame of the bicycle and having two cranks fastened thereto for transferring the muscle power of a cyclist to a drive wheel of the bicycle;
   a planetary gear mechanism arranged in a power train coupled to the crankshaft for driving a chain wheel coupled to a drive wheel of the bicycle, the planetary gear mechanism including a sun gear affixed against rotation relative to the bicycle frame and a plurality of planet gears angularly spaced around the sun gear and meshingly engaged therewith, the plurality of planet gears each being rotatable about a respective axle secured to a planet carrier coupled to the crankshaft for rotation therewith, the planetary gear mechanism further including an annular gear circumscribing the plurality of planet gears and being meshingly engaged therewith, the annular gear being coupled to the chain wheel; and
   at least one torque sensor disposed between the sun gear and the bottom bracket shell for measuring a torque transferred thereto by the sun gear responsive to rotation of the planet gears and planet carrier while drivingly rotating the annular gear to drive the chain wheel;
   wherein the torque sensor is fastened to the bottom bracket shell and the torque sensor has a sleeve arranged approximately concentrically to the crankshaft, to which a strain gauge or a piezo element is fastened, the sleeve being fastened to the bottom bracket shell.

2. The drive unit according to claim 1, wherein the chain wheel is formed on an outer surface portion of the annular gear.

3. The drive unit according to claim 1, wherein a longitudinal axis of the crankshaft coincides with a central axis of the planetary gear mechanism.

4. The drive unit according to claim 3, wherein the torque sensor has a sleeve arranged approximately concentrically to the crankshaft, to which a strain gauge or a piezo element is fastened, the sleeve being fastened to the bottom bracket shell.

5. The drive unit for a vehicle according to claim 1, wherein a motor is operably coupled to the crankshaft for transferring a torque to the crankshaft as a function of a total torque applied through the planetary gear mechanism.

6. The drive unit according to any of claim 5, wherein the chain wheel and the planetary gear are arranged between the bottom bracket shell and a first crank, and wherein the motor is arranged between a second crank and the bottom bracket shell.

7. The drive unit according to any of claim 5, wherein the motor is an electric motor, wherein a housing of the electric motor is fastened to the bottom bracket shell or to the frame of the bicycle.

8. A drive unit for a muscle-powered bicycle comprising:
   a crankshaft mounted for rotation within a bottom bracket shell affixed to a frame of the bicycle and having two cranks fastened thereto for transferring the muscle power of a cyclist to a drive wheel of the bicycle;
   a planetary gear mechanism arranged in a power train coupled to the crankshaft for driving a chain wheel coupled to a drive wheel of the bicycle, the planetary gear mechanism including a sun gear affixed against rotation relative to the bicycle frame and a plurality of planet gears angularly spaced around the sun gear and meshingly engaged therewith, the plurality of planet gears each being rotatable about a respective axle secured to a planet carrier coupled to the crankshaft for rotation therewith, the planetary gear mechanism further including an annular gear circumscribing the plurality of planet gears and being meshingly engaged therewith, the annular gear being coupled to the chain wheel; and
   at least one torque sensor disposed between the sun gear and the bottom bracket shell for measuring a torque transferred thereto by the sun gear responsive to rotation of the planet gears and planet carrier while drivingly rotating the annular gear to drive the chain wheel;

wherein a longitudinal axis of the crankshaft coincides with a central axis of the planetary gear mechanism and the torque sensor has a sleeve arranged approximately concentrically to the crankshaft, to which a strain gauge or a piezo element is fastened, the sleeve being fastened to the bottom bracket shell.

9. The drive unit according to claim 8, wherein the chain wheel is formed on an outer surface portion of the annular gear.

10. The drive unit for a vehicle according to claim 9, wherein a motor is operably coupled to the crankshaft for transferring a torque to the crankshaft as a function of a total torque applied through the planetary gear mechanism.

11. The drive unit according to any of claim 10, wherein the chain wheel and the planetary gear are arranged between the bottom bracket shell and a first crank, and wherein the motor is arranged between a second crank and the bottom bracket shell.

12. The drive unit according to any of claim 10, wherein the motor is an electric motor, wherein a housing of the electric motor is fastened to the bottom bracket shell or to the frame of the bicycle.

\* \* \* \* \*